United States Patent [19]

Yeh et al.

[11] Patent Number: 5,721,830
[45] Date of Patent: Feb. 24, 1998

[54] HOST SIGNAL PROCESSING COMMUNICATION SYSTEM THAT COMPENSATES FOR MISSED EXECUTION OF SIGNAL MAINTENANCE PROCEDURES

[75] Inventors: Han C. Yeh, Sunnyvale; Peter C. Chen, Saratoga, both of Calif.

[73] Assignee: PC-Tel, Inc., Santa Clara County, Calif.

[21] Appl. No.: 527,668

[22] Filed: Sep. 12, 1995

[51] Int. Cl.⁶ ................................................. G06F 13/00
[52] U.S. Cl. ............................... 395/200.67; 395/872
[58] Field of Search ...................... 395/500, 200.12, 395/250, 497.01, 821, 872, 889, 200.57, 200.6, 200.67; 379/93, 97, 58, 77, 79

[56] References Cited

U.S. PATENT DOCUMENTS

| | | | |
|---|---|---|---|
| 4,972,411 | 11/1990 | Fushimi et al. | 370/522 |
| 4,991,169 | 2/1991 | Davis et al. | 370/463 |
| 4,995,074 | 2/1991 | Goldman et al. | 379/97 |
| 5,375,228 | 12/1994 | Leary et al. | 395/183.09 |

Primary Examiner—Parshotam S. Lall
Assistant Examiner—Viet Vu
Attorney, Agent, or Firm—Skjerven, Morrill, MacPherson, Franklin & Friel; David T. Millers

[57] ABSTRACT

An HSP communications system contains a host computer which executes a software modem program and a device containing a circular buffer and a D/A converter. Typically, the host executes update routines in response to interrupts from the device and writes to the circular buffer digital samples representing amplitudes of an analog signal complying with a desired communication protocol. The samples pass through the circular buffer to the D/A converter which converts the samples into an analog communication signal. In environments such as multi-tasking systems, the host may occasionally skip interrupts and not provide new samples when required. In this case, the D/A converter reuses samples in the circular buffer to generate a maintenance signal. The maintenance signal typically does not convey correct data but is sufficient to maintain a communication link and prevent a remote device from disconnecting or entering a retrain mode. To provide a smoother maintenance signal, the circular buffer's size contains samples for an integral number of periods at the carrier and baud frequency of the desired protocol. Error correction and retransmission replace incorrect or lost data.

23 Claims, 9 Drawing Sheets

HOST SIGNAL PROCESSING COMMUNICATION SYSTEM THAT COMPENSATES FOR MISSED EXECUTION OF SIGNAL MAINTENANCE PROCEDURES

CROSS REFERENCE TO RELATED APPLICATION

This document is related to the U.S. patent application entitled "Communications Interface and Conflict Avoidance Using a Software Simulation of a UART", Ser. No. 08/428,935, filed Apr. 25, 1995, which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to communication systems which use host signal processing (HSP), and in particular to interface circuits and processes for maintaining a communication link when a host of an HSP system is unable to maintain a communication signal.

2. Description of Related Art

Host signal processing (HSP) uses a central processing unit (CPU) in a host computer to perform digital signal processing tasks which are more conventionally performed by hardware added to the host computer. For example, a conventional modem receives data from a host computer, converts the data to an analog signal in compliance with a communication protocol, and transmits the analog signal to a remote device. The conventional modem also receives an analog signal from the remote device, extracts data from the analog signal, and transmits the data to the host computer.

In an HSP modem, the host computer executes software which performs many of the conversions performed by hardware in a conventional modem. Hardware in the HSP modem performs simple analog-to-digital and digital-to-analog conversions such as converting a received analog communication signal to a series of digital samples which represent amplitudes of the received signal. The host computer executes software which interprets the samples according to a communication protocol and derives the desired data from the samples. The host computer also generates a series of output samples which represent amplitudes of a transmitted analog communication signal in compliance with the protocol, and hardware of the HSP modem converts the output samples into the transmitted signal.

When compared to conventional modems, HSP modems have less complex (and less expensive) hardware because with HSP modems, the host computer performs many of the task performed by hardware in Conventional modems. However, HSP modems require processing power which is typically obtained by periodically interrupting the host CPU. For example, some communication protocols require that devices at both ends of a communication link transmit and receive constantly. The transmitted signal must be regular, even during a pause in data transmission, so that a receiving device recognizes that the transmitting device is still on the link. In such systems, the HSP modem generates regular interrupts to request samples that are needed to maintain the transmitted signal. However, in some systems such as multitasking systems, the interrupts may be masked, or the host computer may be otherwise unable to execute software required to maintain the transmitted signal. When the host computer is unable to respond, a lapse in transmission occurs, and the device at the other end of the communication link may disconnect or enter a retrain mode. This is unacceptable for modem users. Accordingly, an HSP communication system is needed which maintains a communication link even when a host computer is temporarily unable to execute the software which maintains a communication link.

SUMMARY OF THE INVENTION

In accordance with the invention, hardware in an HSP communication system includes a circular transmit buffer. During normal operation, the host computer periodically adds samples to the circular buffer, for example during interrupts, and a digital-to-analog converter generates a transmitted analog communication signal from the samples in the circular buffer. However, if the host computer is unable to execute the routines which write new samples, the digital-to-analog converter generates a maintenance signal by repeatedly converting old samples from the circular buffer until the host computer provides new samples. Although the maintenance signal usually does not represent the data which should be transmitted, the maintenance signal is typically sufficient to maintain a communication link and prevent a remote device from disconnecting or entering a retrain mode.

In one embodiment of the invention, the size of the circular buffer and a sampling frequency used by the digital-to-analog converter are selected so that the circular buffer holds integral numbers of periods at carrier frequencies and at baud frequencies of the desired communication signal. Thus, the maintenance signal is periodic at the carrier and baud frequencies and relatively smooth at the transition from the last sample to the first sample in the circular buffer. The circular buffer may have a programmable size to create the circular buffer which matches a variety of possible carrier and baud frequencies. In one embodiment, changing the maximum address at which the digital-to-analog conversion wraps to the start of the buffer changes the size of the circular buffer.

Error correction techniques detect and possibly correct invalid data conveyed or lost by the maintenance signal. Typically, valid data is transmitted to and requested from the remote device when the host computer is again able to execute the software required for operation of the HSP communication system.

One embodiment of the invention is a communication device which includes: an interface circuit adapted for connection to a host computer; a circular buffer coupled to receive and store digital samples from the interface circuit; and a digital-to-analog converter which converts samples from the circular buffer into an analog signal for transmission on a communication link. Typically, the communication device also contains an interrupt control circuit which generates interrupts to the host computer, and a sampling clock signal for the digital-to-analog converter has a frequency which is an integer multiple of the frequency of the interrupts.

In another embodiment of the invention, the circular buffer is partitioned into halves; and the host computer fills one half of the buffer during each interrupt. The host fills one half of the buffer while the communication device converts samples from the other half of the buffer. Samples are written faster than they are converted. In this embodiment, interrupts are separated by a time which is equal to the time required to convert all the samples in half of the buffer, and if samples are written in response to every interrupt new samples are provided before they are needed. However, if the host skips interrupts, conversion of samples is repeated to generate a communication signal that maintains a communication link. Typically, if one sample is converted a second time, all the samples in the buffer are converted a second time. A count of the interrupts skipped indicates which half of the buffer is currently being converted. In response to an interrupt signal, the host computer determines which half of the buffer is currently being converted so that writing samples does not interfere with sample conversion.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1A:
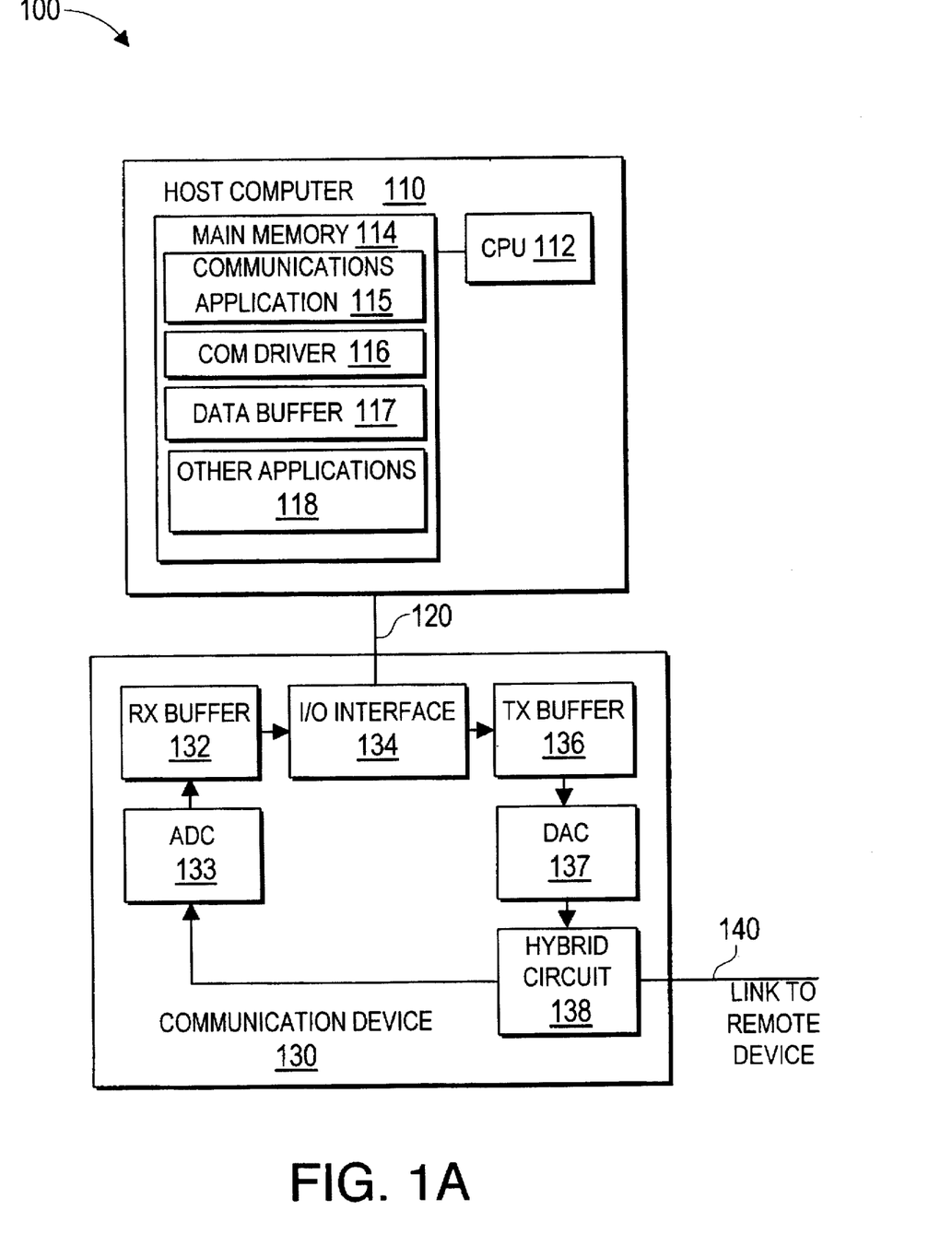
FIG. 1A is a block diagram of a host signal processing communication system in accordance with an embodiment of the invention.

FIG. 1A shows a block diagram of a host signal processing (HSP) communication system 100 in accordance with an embodiment of the invention. System 100 includes a host computer 110 which processes samples representing amplitudes of received and transmitted analog communication signals. System 100 also includes a communication device 130 which contains an analog-to-digital converter 133 that samples the amplitude of the received analog communication signal and a digital-to-analog converter (DAC) 137 that converts samples from host computer 110 to the transmitted analog communication signal. In accordance with one aspect of the invention, device 130 also contains a circular transmit (TX) buffer 136 which host computer 110 fills with samples. If host computer 110 is later prevented from generating new samples to maintain the transmitted signal, DAC 137 reuses samples already in circular buffer 136 and generates a maintenance communication signal sufficient to maintain a communication link 140.

Device 130 connects to a local bus 120 of host computer 110 and to a physical interface (typically PSTN lines) of communication link 140. In one embodiment of the invention, host computer 110 is an IBM or compatible personal computer, and local bus 120 is an ISA, VESA, or PCI bus. Device 130 receives digital samples from and transmits digital samples to host computer 110 via local bus 120 and receives analog signals from and transmits analog signals to a remote device (not shown) via a hybrid circuit 138 and communication link 140.

Host computer 110 includes a CPU 112 which executes software under supervision an operating environment such as Microsoft WINDOWS™ or MS-DOS. In accordance with an embodiment shown in FIG. 1A, CPU 112 executes a communication application 115 which generates data for transmission to the remote device via communication link 140. Communication applications are well known and may for example generate and interpret data for communication over a conventional modem. Once data is generated and stored in a data buffer 117, application 115 calls routines in the operating environment which in turn call a communication (COM) driver 116. COM driver 116 converts the data to digital samples of an analog signal that represents the data and transmits the digital samples to device 130.

Application 115 can communicate with device 130 via a software universal asynchronous receiver transmitter (UART) in COM driver 116. A software UART allows communications using standard communication ports provided in the operating environment of host computer 110 even when device 130 has an input/output (I/O) interface 134 that is non-standard and tailored to the functions performed by device 130. U.S. patent application Ser. No. 08/428,935, which is incorporated by reference above, describes circuits and processes for implementing a software UART with a non-standard I/O interface device.

COM driver 116 converts data from application 115 to a series of digital samples representing amplitudes of an analog signal which complies with a communication protocol. The communication protocol employed in system 100 is selected for communication link 140. Communication protocols are available for a great variety of applications including modems, facsimile machines, and video phones operating at various baud rates. Examples of well known communication protocols include V.17, V.21, V.22bis, V.27ter, V.29, V.32bis, and V.34. COM driver 116 implements one or more communication protocol as required for communication link 140 and can be changed to a new protocol for a new or different the application of system 100. Little or no change to hardware in device 130 is required for different protocols.

COM driver 116 transmits digital samples via local bus 120 to device 130 where the digital samples are stored in circular buffer 136. DAC 137 generates the transmitted analog signal from the samples in circular buffer 136. COM driver 116 includes a periodically executed update routine which write new samples to circular buffer 136 to maintain a continuous transmitted signal on link 140. Typically, update routines perform a data block write to device 130. Data block writes to devices on a local bus are well known in the art. In one embodiment, host computer 110 executes the update routines during interrupts initiated by an interrupt queue (IRQ). When other applications in a multi-tasking environment mask the interrupts for device 130, some IRQs can be missed, but DAC 137 continues converting samples from circular buffer 136 possibly including samples which have not been updated. This provides a maintenance communication signal which may not be the desired transmitted signal but is sufficient to maintain communication link 140 and prevent the remote device from disconnecting or entering a retrain mode.

An analog communication signal according to a typical communication protocol has a carrier frequency fc and variations at a baud frequency (or baud rate) fb. The size of circular buffer 136 and a sampling frequency fs of DAC 137 are selected so that samples in circular buffer 136 represent an integer number of complete periods at carrier frequency fc and an integer number of complete periods at baud frequency fb. In general, the carrier and baud frequencies fc and fb should be an integer multiple of the sampling frequency fs divided by the size of circular buffer 136. For example, if the transmitted signal has carrier frequency fc of 1800 Hz and baud frequency fb of 2400 Hz, and DAC 137 has a sampling frequency of 7200 Hz, circular buffer 136 with the capacity to store 12 digital samples holds enough samples for three periods at the baud frequency and four periods at the carrier frequency.

Figure 1B:
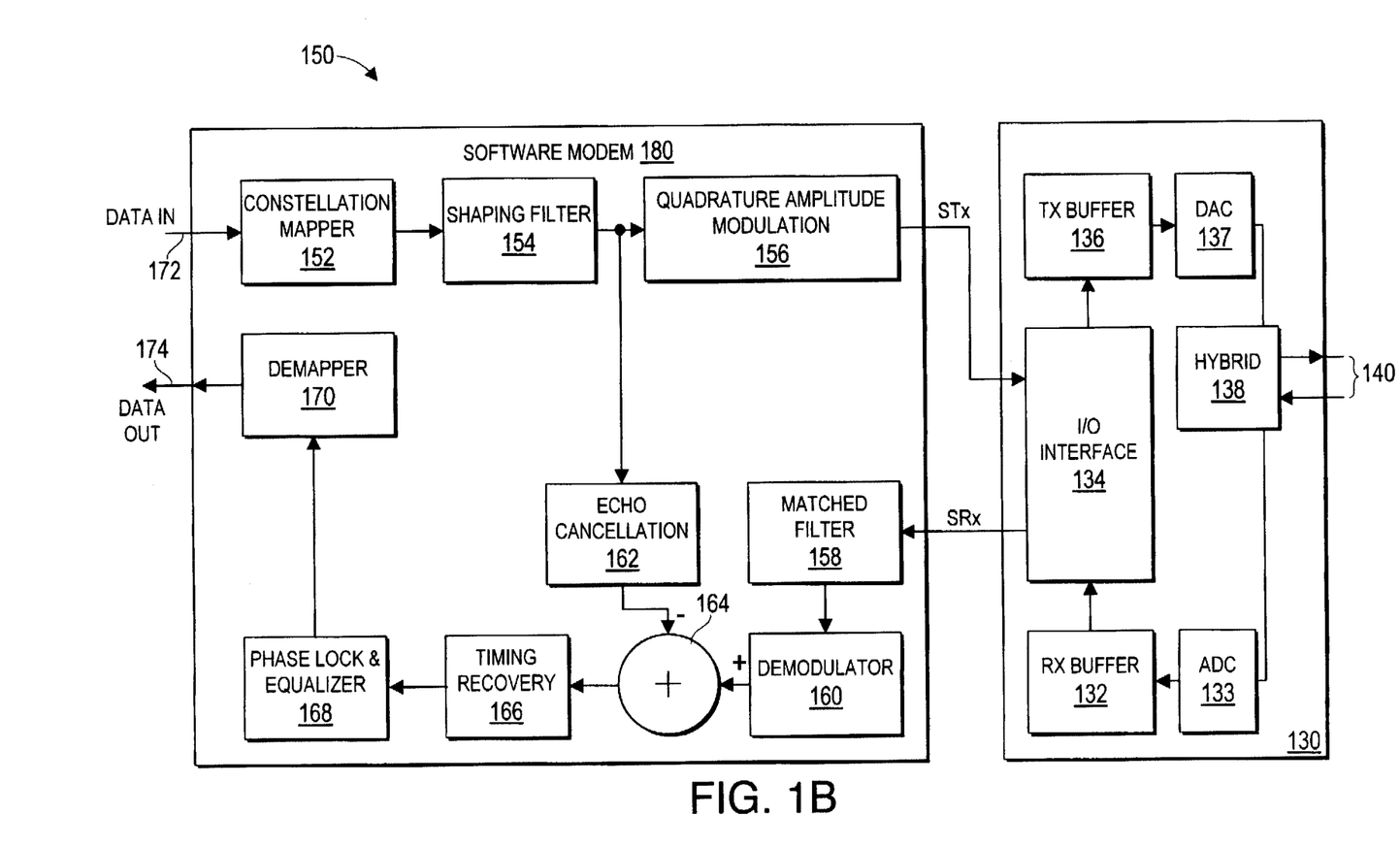
FIG. 1B is a block diagram of a host signal processing modem in accordance with an embodiment of the invention.

FIG. 1B shows a block diagram of an HSP modem 150 in accordance with an embodiment of the invention. HSP modem 150 contains communication device 130 and a software modem 180 which is typically part of COM driver 116. Software modem 180 operates on a data stream 172 from data buffer 117 and generates a series of samples STx representing amplitudes in a transmitted signal that complies with a standard communication protocol. Data stream 172 is divided into packets of bits, each of which corresponds to one period of baud frequency fb for HSP modem 150. The number of bits in a packet depends on the communication protocol implemented by HSP modem 150.

To implement conventional quadrature amplitude modulation (QAM), a constellation mapper 152 maps each packet from data stream 172 to the co-ordinates of a point in a plane. In one embodiment, each packet contains two bits, and constellation mapper 152 consecutively maps each packet to one of four points defined by the protocol. For example, values 00b, 01b, 10b, and 11b are mapped to co-ordinates (A,B) which equal (−1,−1), (−1,1), (1,−1), and (1,1) respectively for compliance with a protocol such as V.22. In another embodiment, each packet contains four bits which constellation mapper 152 maps to co-ordinates representing one of 16 points for compliance with a protocol such as V.22bis.

Constellation mapper 152 provides a stream of co-ordinates A(i) and B(i) where i is an index which numbers the periods at baud frequency fb. A shaping filter 154 filters the time variation of co-ordinates A(i) and B(i) performs interpolation to create a stream of co-ordinates A'(j) and B'(j) where j is an index which numbers periods of the sampling frequency fs. Co-ordinate streams A'(j) and B'(j) have narrower bandwidths than co-ordinate streams A(i) and B(i). A quadrature amplitude modulation procedure 156 determines samples STx(j) from co-ordinates A'(j) and B'(j) using the following formula.

$$STx(j)=A'(j)*\cos(2\pi(fc/fs)*j)-B'(j)*\sin(2\pi(fc/fs)*j)$$

The host computer writes samples STx(j) to device 130 which sequentially converts samples STx(j) to the transmitted analog communication signal.

Device 130 converts the received signal into a series digitized received samples SRx(j) which the host computer reads from Rx buffer 132 via I/O interface 134. A matched filter 158 filters received samples SRx(j) to remove noise and generate a received base band signal SRx'(j). Signal SRx'(j) represents the real part of $[C''(j)+i*D''(j)]*e^{i(2\pi(fc/fs))}$ where i is the squareroot of −1. A demodulation procedure 160 performs an inverse transform, i.e. $SRx'(j)*e^{[i(2\pi(fc/fs))]}=C''(j)+i*D''(j)$, to determine recovered baseband signals C''(j) and D''(j).

A number of concerns must be addressed when converting baseband signals C'' and D'' into data values. One concern is noise such as echoes which occur in device 130 and on communication link 140. Another concern is synchronizing samples with the baud and carrier frequencies used by the remote device on link 140. An echo cancellation process 162 stores co-ordinates A' and B' which where previously sent to device 130 and/or transmitted on communication link 140. Baseband signals C'' and D'' are compared to the previous values of co-ordinates A' and B' to determine what portion of baseband signals C'' and D'' are due to echoes. In one embodiment, two types of echoes are considered a near end echo and a far end echo, and best fit delays and magnitudes are determined for both echoes. To cancel the echo, an adder 164 subtracts from baseband signals C'' and D'' an amount determined from co-ordinates A' and B' to provide echo corrected signals C' and D'.

Echo cancellation process 162 maintains a buffer filled with co-ordinates A' and B' for samples just transmitted. As discussed below, when interrupts are missed, device 130 continues to transmit even though the host computer does not provide new samples. After a missed interrupt, echo cancellation process 162 is deactivated, and the buffer of co-ordinates is flushed to remove co-ordinates which differs from the transmitted samples. Echo cancellation process 162 is only resumed after the buffer is full of correct co-ordinate values.

A timing recovery process 166 determines the baud frequency fb of the remote device and combines the values C'(j) and D'(j) into average values C'(i) and D'(i) which are averaged over a period of the baud frequency fb of the remote device. Values C'(i) and D'(i) are typically not exactly equal to one of the selected points defined by the communication protocol. A phase lock and equalization procedure 168 shifts values C'(i) and D'(i) to values C(i) and D(i) which are exact for one of the selected points of the protocol. A demapper 170 maps values C(i) and D(i) to a corresponding packet of data bits which are part of an output data stream 174. Other operations according to the protocol such as error detection and error correction are then performed on the data before storing the data in data buffer 117 for use by the communication application.

Figure 2:
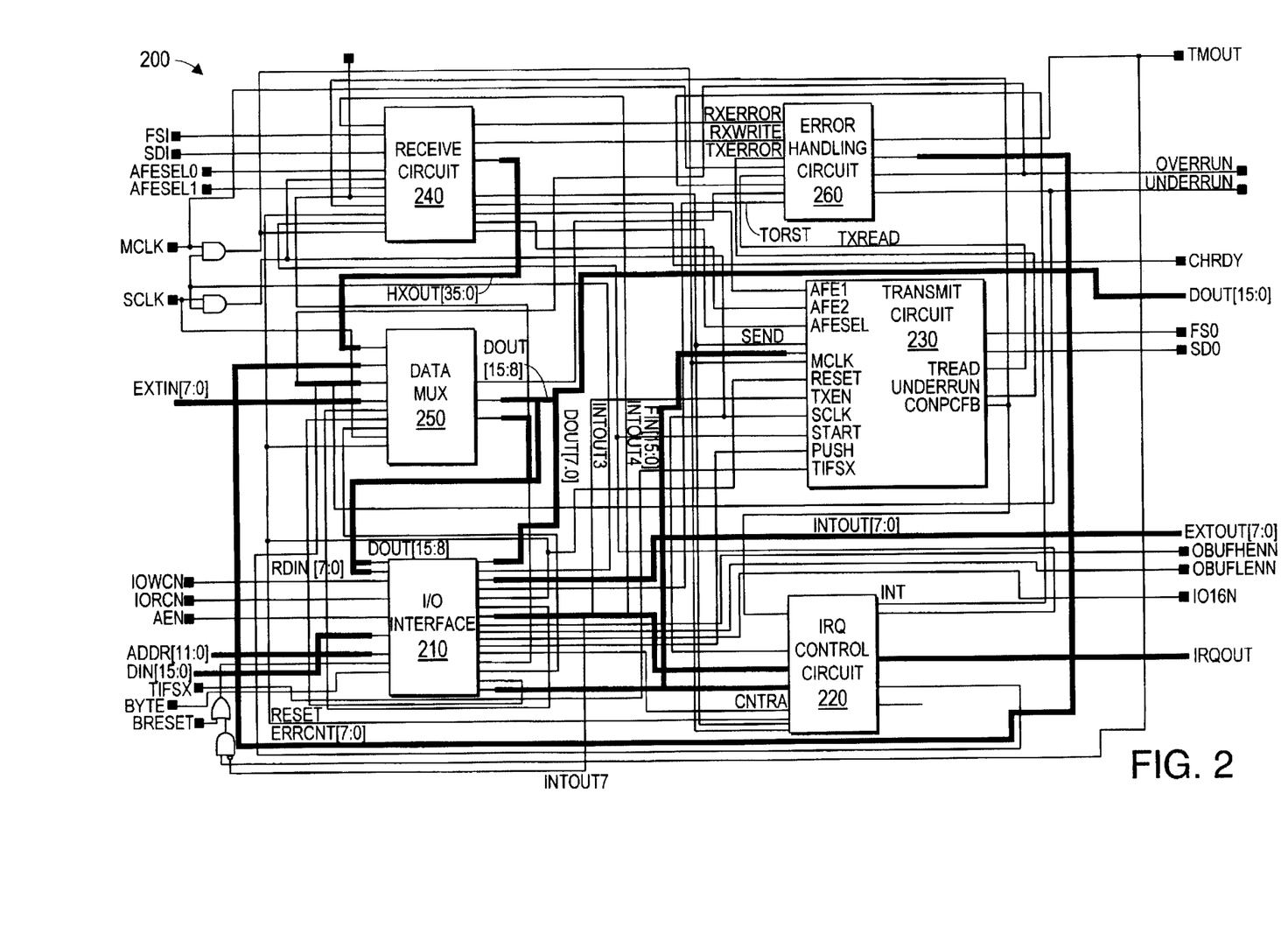
FIG. 2 is a block diagram of communication hardware for an HSP modem in accordance with an embodiment of the invention.

FIG. 2 shows a block diagram of hardware 200 for an HSP modem in accordance with an embodiment of the invention. Hardware 200 contains an I/O interface 210, an IRQ control circuit 220, a transmit circuit 230, a receive circuit 240, a data path multiplexer 250, and an error handling circuit 260. I/O interface 210 and IRQ control 220 provide an interface for communications with a host computer through an ISA bus. Not shown in FIG. 2 are input buffers, output buffers, pull-up devices, and pull-down devices which are well known for ISA bus interfaces.

I/O interface 210 contains 8-bit registers for data and control information. Signal ADDR[11:0] is an address signal from the ISA bus which selects hardware 200 and a particular register within I/O interface 210. Data signals DIN [15:0] and DOUT[15:0] are input and output data signal for 16 data lines on the ISA bus. Byte enable signals DBUFHENN and DBUFLENN enable access to the high or low bytes of the data signals DIN[15:0] and DOUT[15:0]. Signals IOWCN, IORCN, AEN, BRESET, CHRDY, IO16N are conventional for the ISA bus standard. Signals AFESEL0, AFESEL1, TIFSX, and BYTE are for a codec interface. Signals AFESEL0 and AFESEL1 select which codec is used. Signal BYTE selects either byte or word operations.

The host computer reads and writes digital samples, reads status values, and writes control values in registers in I/O interface 210. Control and status values control and indicate the operation of hardware 200 and external devices (not shown). Such devices include, for example, a relay which connects and disconnects the HSP modem and the physical interface of the communication link (phone lines). I/O interface 210 generates a signal EXTOUT[7:0] for controlling the external devices.

IRQ control circuit 220 generates on one of the lines of a multi-line output bus IRQOUT a periodic interrupt signal corresponding to a user selected IRQ number for device 200. The period of the interrupt signal depends on the size of buffers in receive circuit 240 and transmit circuit 230. In one embodiment of the invention, the interrupt signal has a period that is less than or equal to the time required for a serial codec (not shown) to fill half of the Rx buffer in receive circuit 240 or read half of the Tx buffer in transmit circuit 230. When the interrupt signal is asserted, the host computer executes a COM driver routine which reads samples from the Rx buffer in receive circuit 240 and fills half of the Tx buffer in transmit circuit 230 with samples.

Transmit circuit 230 and receive circuit 240 create an interface for transferring samples between I/O interface 210 and the serial codec. Each circuit 230 and 240 uses a clock signals MCLK and SCLK from external clock circuits (not shown). Signal MCLK controls the timing of memory operations for buffers in circuits 230 and 240, and signal SCLK controls the sampling frequency fs at which the serial codec reads and writes samples. Signals SDI and SDO are input and output serial data signals to and from the codec. Signals FSI and FSO are input and output frame signals which indicate the starts of words in input and serial output data streams.

Data path multiplexer 250 controls the flow of internal data signals and an input signal EXTIN[7:0] from the external devices. In one embodiment of the invention, one of eight signals in signal EXTIN[7:0] is from a ring detection circuit which sense ringing on the physical interface, a PSTN phone line, of the communication link. Error handling circuit 260 detects underflow and overflow errors for the buffers in transmit circuit 230 and receive circuit 240 and generates a signal ERRCNT[7:0] which indicates the number of interrupts generated since the last time the host wrote digital samples to hardware 200.

Figure 3:
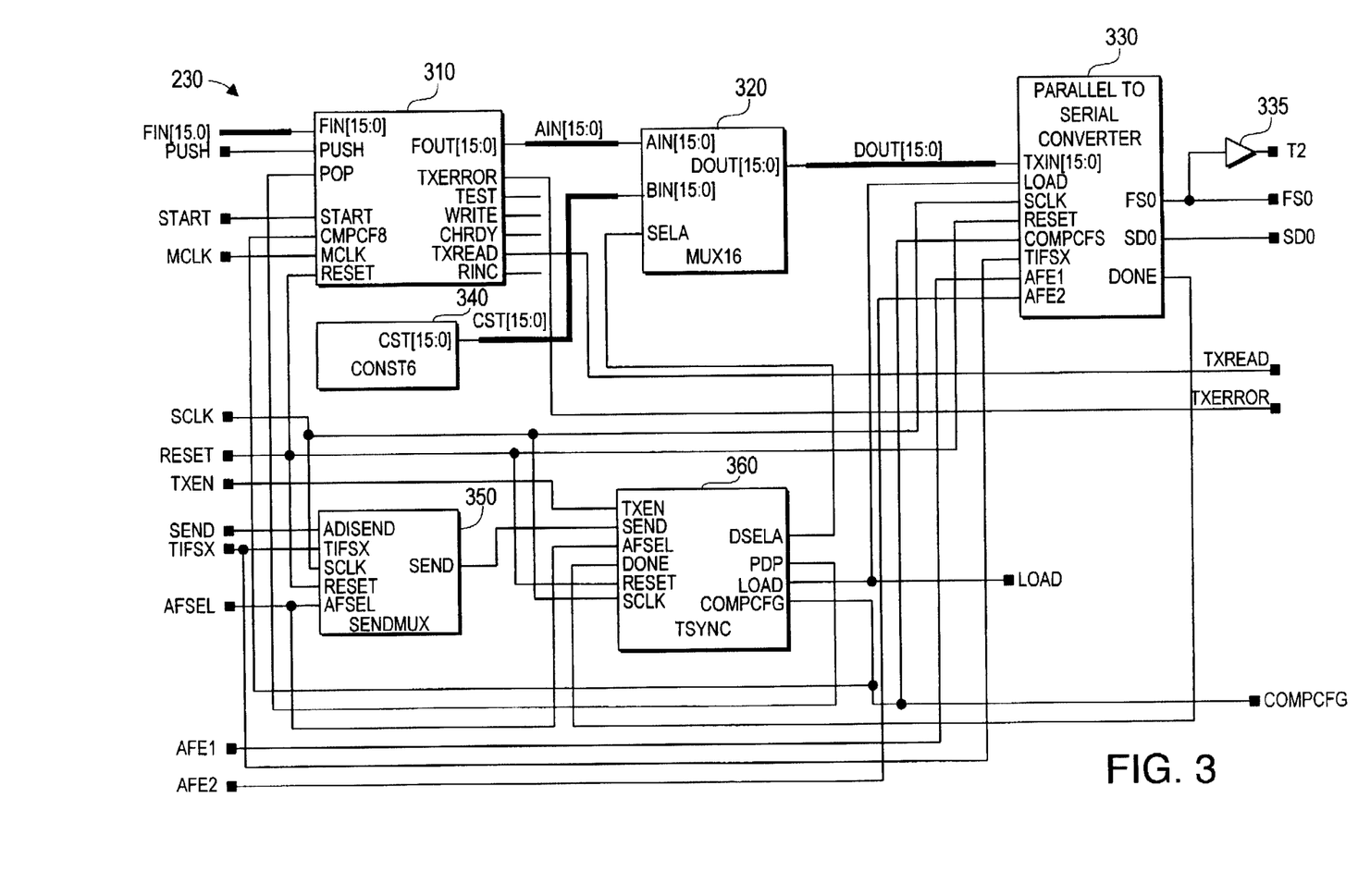
FIG. 3 is a block diagram of transmission hardware for the HSP modem of FIG. 2.

FIG. 3 shows a block diagram of transmit circuit 230 which generates a serial bit stream for the serial codec. Transmit circuit 230 contains a circular buffer 310, a parallel-to-serial converter 330, and control circuits 350 and 360. I/O interface 220 writes digital samples to circular buffer 310 by asserting an input data signal FIN[15:0] and asserting a write signal PUSH. Control circuit 360 asserts a read signal POP to cause circular buffer 310 to change an output data signal FOUT[15:0]. Together control circuits 350 and 360 select and implement the correct timing for communication with the codec connected to codec interface. Such codec interface can be implemented in a variety of ways which are well known in the art.

Figure 4:
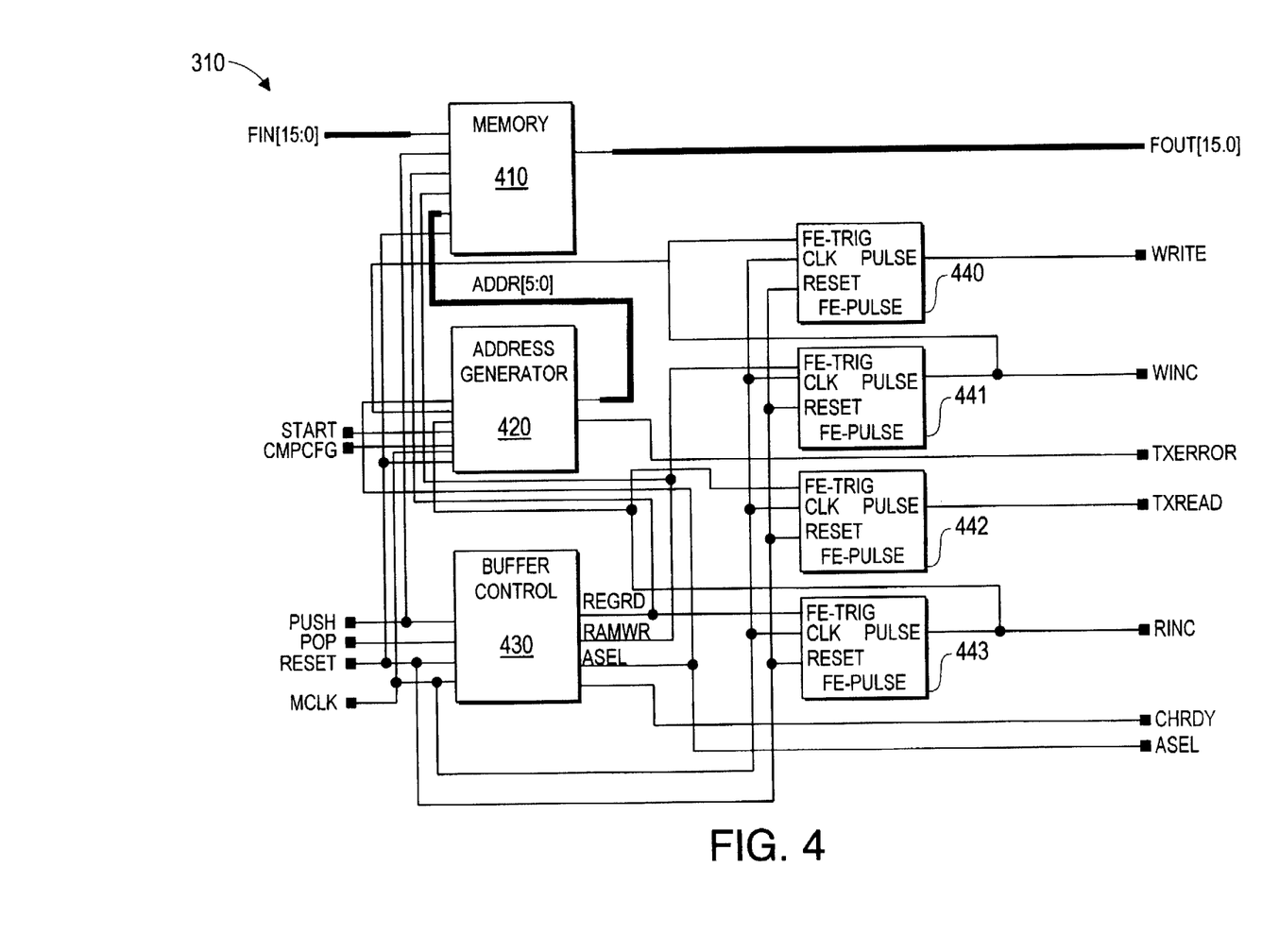
FIG. 4 is a block diagram of a circular buffer for the transmission hardware of FIG. 3.
Figure 5:
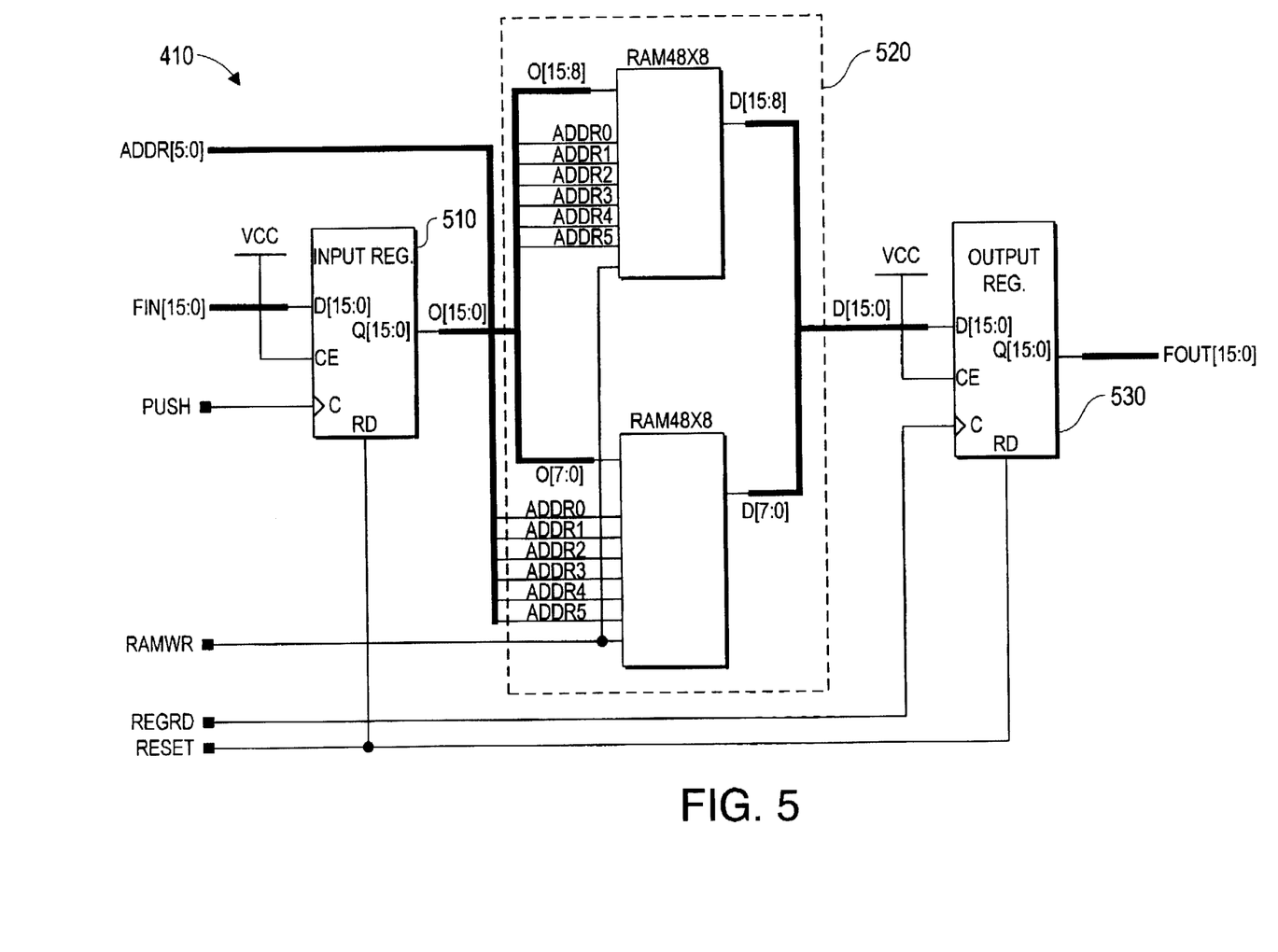
FIG. 5 is a block diagram of a memory for the circular buffer of FIG. 4.

FIG. 4 shows a block diagram of an embodiment of circular buffer 310. Circular buffer 310 contains a memory 410, an address generator 420, a buffer control 430, and pulse circuits 440 to 443. Signal FIN[15:0] provides samples which are to be stored in memory 410. As shown in FIG. 5, memory 410 contains a 16-bit input register 510, a 48×16-bit RAM 520, and a 16-bit output register 530. To write to memory 410, I/O interface 210 asserts signal FIN[15:0] and signal PUSH to memory 410. Input register 510 immediately stores a sample. Writing the sample to RAM 520 may be delayed to avoid conflicts with reading from RAM 520.

Memory 410 provides a new value for output signal FOUT[15:0] when buffer control 430 asserts a signal REGRD in response to signal POP. Signal REGRD is delayed relative to signal POP while buffer control 430 arbitrates between reads and writes to RAM 520. When signal REGRD is asserted, register 530 stores data read from RAM 520 and changes output signal FOUT[15:0].

Buffer control 430 controls the timing of writes from input register 510 to RAM 520 and reads from RAM 520 to output register 530. To write from register 510 to RAM 520, buffer control 430 first asserts a signal ASEL which causes address generator 420 to generate an address signal ADDR[5:0] indicating a write pointer value, and then buffer control 430 asserts a signal RAMWR to select writing to RAM 520. To read from memory 410, buffer control 430 deasserts signal RAMWR to select reading from RAM 520, deasserts signal ASEL which causes address generator 420 to generate an address signal ADDR[5:0] indicating a read pointer value, and then asserts signal REGRD which causes output register 530 to latch the output signal from RAM 520.

Address generator 420 maintains a read pointer and a write pointer which indicate addresses in RAM 520, at which samples are read and written. Each time a sample is written to (or read from) RAM 520 the write pointer (or read pointer) is incremented. When the write pointer (or read pointer) increments past a wrap-around address, typically the last address in RAM 520, the write pointer (or read pointer) is reset to the first address in RAM 520.

Figure 6A:
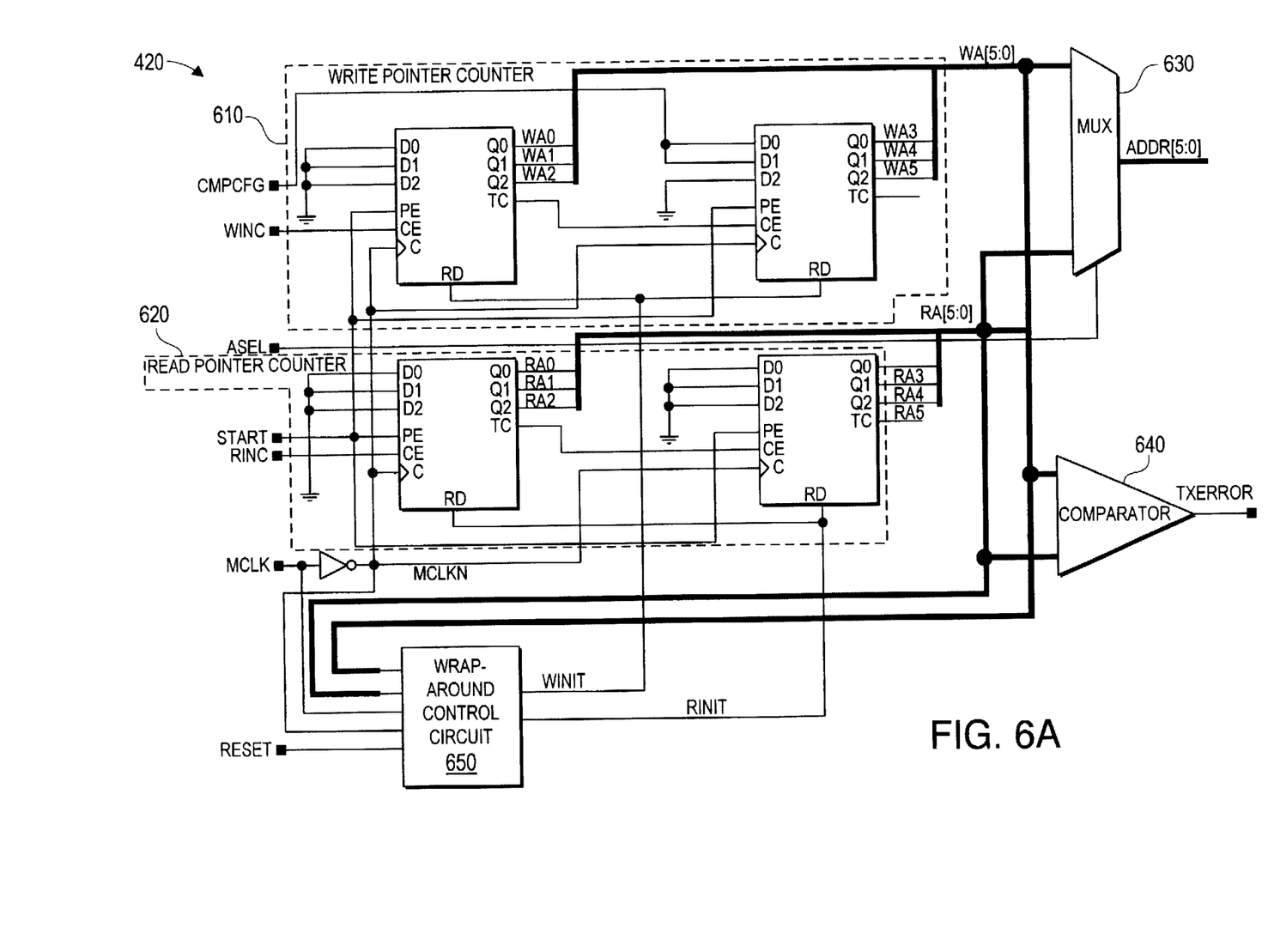
FIGS. 6A and 6B are block diagrams showing an address generator for the circular buffer of FIG. 3.
Figure 6B:
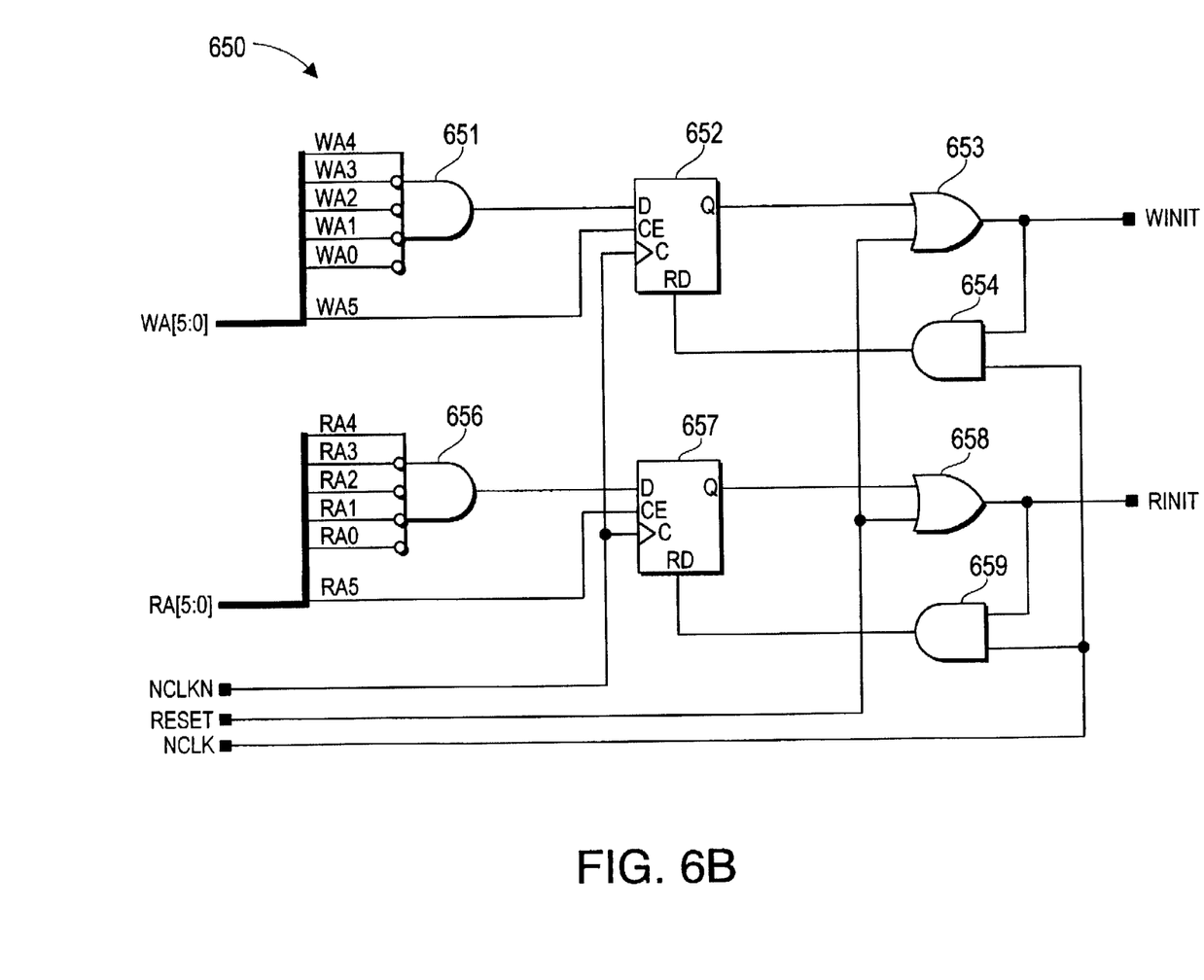

FIGS. 6A and 6B show block diagrams of an embodiment of address generator 420. Address generator 420 contains counters 610 and 620, a multiplexer 630, a comparator 640, and a wrap-around control circuit 650. Counters 610 and 620 respectively store the write and read pointers for RAM 520. During a write to RAM 520, buffer control 430 asserts select signal ASEL, and multiplexer 630 sets address signal ADDR[5:0] equal to a signal WA[5:0] which indicates the write pointer. During a read from RAM 520, buffer control 430 deasserts select signal ASEL, and multiplexer 630 sets address signal ADDR[5:0] equal to a signal RA[5:0] which indicates the read pointer.

Counter 610 or 620 increments the write or read pointer respectively each time a sample is respectively written to or read from memory 410. When triggered by signals RAMWR and REGRD respectively, pulse circuits 441 and 443 (FIG. 4) assert pulses in signals WINC and RINC respectively to counters 610 and 620. During each pulse of signal WINC and RINC, clock signal MCLK increments the respective write or read pointer. Wrap-around control circuit 650 checks the write and read pointers from counters 610 and 620 and when a pointer exceeds the wrap-around address for RAM 520, asserts a signal WINIT or RINIT to reset that pointer value to a value indicated by data inputs to counter 610 or 620.

FIG. 6B shows a block diagram of wrap-around circuit 650 for an embodiment where RAM 520 contains 48 storage locations corresponding to addresses from 000000b to 101111b. When write pointer counter 610 increments signal WA[5:0] to 110000b, an AND gate 651 sets an input voltage to a flip-flop 652 high. An output signal from flip-flop 652 goes high when a clock signal MCLKN (the inverse of signal MCLK) triggers flip-flop 652. An OR gate 653 coupled to flip-flop 652 asserts signal WINIT which resets counter 610. An AND gate 654 resets flip-flop 652 when signal WINIT is high and clock signal MCLK is high. Thus, signal WINIT is asserted for about a half period of signal MCLK. Elements 656 to 659 assert signal RINIT according to the value of signal RA[5:0] in the same manner as elements 651 to 654 assert signal WINIT according to the value of signal WA[5:0].

In the embodiment of FIG. 6B, the wrap-around address is 110000b, the address at which signal WA[5:0] or RA[5:0] causes the output signal from AND gate 651 or 656 to be high and enables flip-flop 652 or 657. Alternatively, AND gates 651 and 656 can be replaced by a register and two comparators which compare signals RA[5:0] and WA[5:0] to a value in the register. Changing the value in the register changes the wrap-around address and changes the effective size of the circular buffer 310. This can reduces the size circular buffer 310 to adjust for the carrier frequency fc and baud rate fb of a communication protocol.

During normal operation, the write pointer stays ahead of the read pointer. In one exemplary embodiment, RAM 520 is logically divided into two halves corresponding to addresses 000000b to 010111b and 011000b to 101111b. The read pointer is initialized to 000000b, the beginning of one half, and the write pointer is initialized to 011000b, the beginning of the other half. (A signal CMPCFG to counter 610 is set high when wrap-around circuit 650 asserts signal WINIT to initialize the write pointer to 011000b.) Parallel-to-serial converter 330 receives samples read from memory 410 at the frequency fs of sample clock signal SCLK and converts the samples to a serial bit stream signal SDO and a frame synchronization signal FSO for a serial codec. The read pointer increments for each value read.

When IRQ control circuit 220 generates an interrupt, the host computer executes COM driver interrupt routines. The interrupt routines check error bits in a status register in I/O interface 210. If no errors error bits are set, the routines writes a block samples to memory 410. The Appendix contains a C language listing of an embodiment of such interrupt routines. In one embodiment of the invention, the communication driver writes samples which fill half of circular buffer 310. Accordingly, during each interrupt a set of 24 samples are written, and the write pointer increments to either 000000b or 011000b which is the address of the beginning of the next half of memory 410. The samples written do not overwrite the half of memory 410 currently being read because the write pointer starts at the beginning of the half of memory 410 not being read. Reading of samples continues at the sampling frequency, and the read pointer eventually increments into the half of memory just written. If IRQ control circuit 220 generates an interrupt every 24 periods of sample clock signal SCLK and the interrupt routines write 24 samples every interrupt, the write pointer stays ahead of the read pointer, and the interrupt routines provide a series of digital samples for conversion into a transmitted signal. However, in a multi-tasking environment, applications can mask interrupts or otherwise prevent the host computer from executing routines when required to maintain the stream of samples through circular buffer 310. When this occurs, the read pointer increments past the write pointer.

Comparator 640 (FIG. 6A) in address generator 420 compares write pointer signal WA[5:0] to read pointer signal RA[5:0] and asserts a signal TXERROR when the two are equal. When the read and write pointers are equal, the read pointer points to data that transmit circuit 230 has already sent to the serial codec; and if that data is read, the host was unable to provide the samples required to maintain a transmitted signal. Circular buffer 310 contains samples which are reused in a circular fashion until the host computer is able to supply new samples. The transmitted signal, while not conveying the desired data from an application executed by the host computer, can maintain a communication link. In particular, circular buffer 310 contains an integer number of periods at the carrier frequency fc and an integer number of periods at the baud frequency fb of the communication protocol. Accordingly, samples from circular buffer 310 provide a transmitted signal without a major discontinuity at the transition from the wrap-around address to the first address in circular buffer 310. The transmitted signal repeats a pattern which the communication driver previously generated in accordance with the protocol. The repeated pattern is generally sufficient to maintain a communication link and prevent a remote device from going into a retrain mode or disconnecting.

Figure 7:
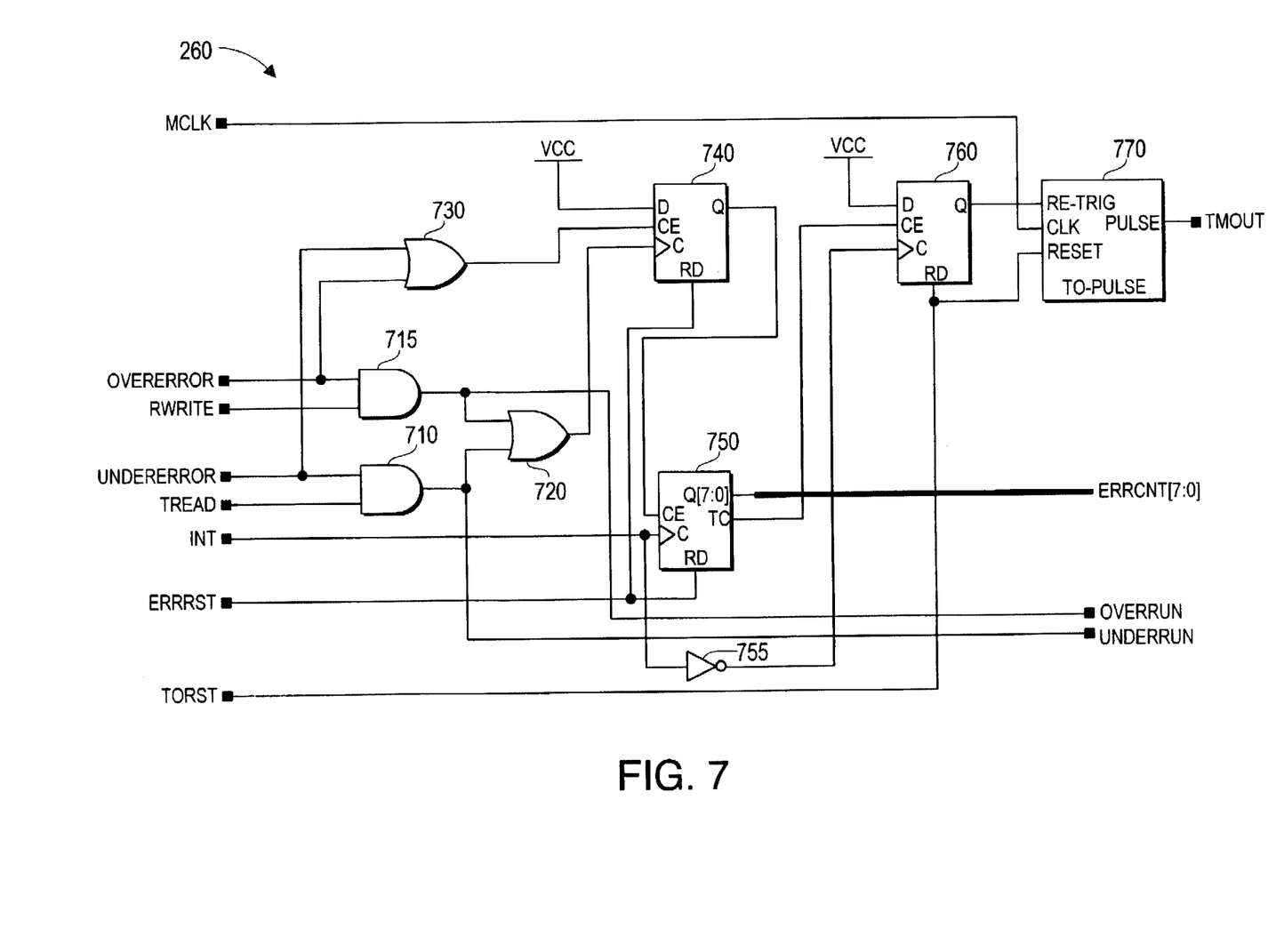
FIG. 7 is block diagram of an error handling circuit for the system of FIG. 2.

FIG. 7 shows an embodiment of error handling circuit 260. When the host computer fails to respond to an interrupt, error handling circuit 260 asserts signals UNDERRUN and/or OVERRUN which set error bits in a status register in I/O interface 210 and counts interrupts until the host responds. Error handling circuit 260 receives signals TXERROR and TXREAD from transmit circuit 230 and signal RXERROR and RXWRITE from receive circuit 240. When transmit circuit 230 simultaneously asserts signals TXERROR and TXREAD, an AND gate 710 asserts signal UNDERRUN to indicate that the supply of samples from the host is insufficient. An AND gate 715 asserts signal OVERRUN when receive circuit 240 simultaneously asserts signals RXERROR and RXWRITE to indicate that samples representing the received signal have overflowed the buffer in receive circuit 240.

When either signal OVERRUN or UNDERRUN is asserted, OR gates 720 and 730 trigger a flip-flop 740 which enables a counter 750. Counter 750 counts pulses of a signal INT from IRQ control circuit 220 which indicate when interrupts were generated. A signal ERRRST resets counter 750 and flip-flop 740 when the host computer responds to an interrupt and executes an appropriate routine in the COM driver. A signal ERRCNT[7:0] from counter 750 indicates a count of the interrupts which have occurred since an overflow or underflow of samples. If the count reaches a point where a carry bit TC is set, a flip-flop 760 and a pulse circuit 770 generate a pulse in a signal TMOUT to indicate an overflow of counter 750.

The communication driver checks a count of skipped interrupts when the host responds to an interrupt from IRQ control circuit 220. If signal ERRCNT[7:0] represents an even count, the read and write pointers in buffer 310 point to different halves of memory 410, and the communication driver resets counter 750 and writes new samples to buffer 310. If signal ERRCNT[7:0] represents an odd count, the read and write pointers in buffer 310 point to the same half of memory 410. The communication driver resets counter 750 but does not write new samples to buffer 310. During the next interrupt, the read and write pointers point to different halves of buffer 310, and a block of 24 samples may be written as normal.

The COM driver implements the correct communication protocol for the communication link including error detection and error correction processes. During the time that the interrupts are missed, the remote device typically uses error correction codes to detect errors in data transmitted while samples from buffer 310 were reused. The remote device may be able to correct errors to reconstruct transmitted data. More typically the remote device cannot correct detected errors and requests retransmission. The communication driver responds by transmitting samples representing the requested data.

The communication driver uses the count of skipped interrupts to determine how many samples and how much data from the remote device was lost while the host was unable to respond to interrupts from IRQ control circuit 220. The communication driver requests retransmission of the lost data.

Although the present invention has been described with reference to particular embodiments, the description is only an example of the invention's application and should not be taken as a limitation. Various adaptations and combinations of features of the embodiments disclosed are within the scope of the invention as defined by the following claims.

APPENDIX

The C language code in this appendix was written by Han C. Yeh is subject to copyright protection.

An update routine determines whether the underrun/overrun flag is set in a status register ASICstatus of a device (ASIC) attached to a local bus. If the flag is not set, the routine calls functions WrASIC() and RdASIC() which perform a block write and a block read to the device. If the flag is set, the update routine determines whether the number of the missing interrupts is even or odd and bypasses the read and write calls if the number is even. If the number of missing interrupts is odd, the update routine executes functions WrASIC() and RdASIC().

```
// Update Routine
    if (ASICstatus&STS_UORW)
    {
        g1.uoCnt = UO_RUN_LOOP_COUNT; // for v32 only
        g1.uoRun = TRUE;
        UOSetup( ) ;
        if (ASICstatus&0x1)
        {
            WrASIC( );
            RdASIC( );
                // for ASIC r/w pointer alignment
        }
        if((g1.sramPtr->cmdCode==Loop3) ||
           (g1.sramPtr->cmdCode==START_UP) ||
           (g1.sramPtr->cmdCode==RETRAIN) ||
           (g1.sramPtr->cmdCode==RE_RETRAIN))
            return; // skip DSP process
        else
            RestartPt( ); // reset ASIC
    }
    else
    {
        WrASIC.( );
        RdSIC( );
    }
#endif
```

Module UOSetup( ) adjusts the timing recovery and the receiver PLL (Phase-Locked Loop) processes after under/over run occurs in an HSP modem.

```
void UOSetup (void)
{
    int uoNum;
    float step;
    uoNum = (ASICstatus & STS_UO_MASK)+1;
        // check # of IRQ missed & update rx PLL
    if(g1 . modem==v29)
    {
        g29.txSineIndex += (g1.baudNum*uoNum);
            // update v29 tx modulator index
        g29.rxSineIndex +=
            (V29_RX_SAMPLE_NUMBER*uoNum);
            // update v29 rx demodulator index
        while(g29.txSineIndex>= V29SINT_LENGTH)
            g29.txSineIndex -= v29SINT_LENGTH;
        while(g29.rxSineIndex >=
                V29_RX_COS_SIN_TABLE_SIZE)
            g29.rxSineIndex -=
                V29_RX_COS_SIN_TABLE_SIZE;
    }
    g1.rxPllPhase += (g1.rxPllFreq*g1.baudNum*uoNum);
    while(g1.rxPllPhase>= TWOPIE)
        g1.rxPllPhase -= TWOPIE;
    while(g1.rxPllPhase<= -TWOPIE)
        g1.rxPllPhase += TWOPIE;
```

-continued

```
    g1.rxPllIndex =
        MyNRftoi(g1.rxP11Phase*-STEPS_PER_RADIUM);
    if((g1.modem==v22) || (g1.modem==v29))
        step = CLOCK_SMALL_STEP_TO2;
    else
        step = CLOCK_SMALL_STEP_2TO3;
        // update clock recovery PLL
    g1.clockPhaseOffset +=
        (g1.clockFreqOffset*g1.baudNum*uoNum);
    while(g1.clockPhaseOffset >= CLOCK_THRESHOLD)
    {
        g1.clockPhaseOffset -= CLOCK_THRESHOLD;
        g1.timing += step;
    }
    while(g1.clockPhaseOffset <-CLOCK_THRESHOLD)
    {
        g1.clockPhaseOffset += CLOCK_THRESHOLD;
        g1.timing -= step;
    }
}
```

Module UORun() is executed after the update routine detects an under/over run. Module UORun() bypasses the echo cancellation so that the receiver portion of the HSP modem does nothing during a transient period (about 20 ms) but update co-ordinates for echo cancellation before going back to normal operation.

```
void UORun(void)
{
    int i;
    for(i=0; i<V32_BAUD_NUMBER; i++)
    {
        g1.rxPllPhase += g1.rxPllFreq;
            // update rx PLL
        while(g1.rxPllPhase >= TWOPIE)
            g1.rxPllPhase -= TWOPIE;
        while(g1.rxPllPhase <= -TWOPIE)
            g1.rxPllPhase += TWOPIE;
        g1.rxPllindex =
            MyNRftoi(g1.rxPllPPhase*-STEPS_PER_RADIUM);
        g1.clockPhaseOffset += g1.clockFreqOffset;
            // update clock recovery PLL
        if(g1.clockPhaseOffset >= CLOCK_THRESHOLD)
        {
            g1.clockPhaseOffset = ZERO;
            g1.timing += CLOCK_SMALL STEP_2TO3;
        }
        else if(g1.clockPhaseOffset<-CLOCK_THRESHOLD)
        {
            g1.clockPhaseOffset = ZERO;
            g1.timing -= CLOCK_SMALL_STEP_2TO3;
        }
    }
}
```

I claim:
1. A communication system comprising:
  a host computer comprising:
    a device bus; and
    means for generating digital samples and writing the digital samples to the device bus, wherein a series of the digital samples represent amplitudes of an analog signal in compliance with a communication protocol; and
  a device coupled to the device bus, wherein the device comprises:
    a circular buffer adapted for storage of the digital samples written to the device bus; and
    a digital-to-analog converter coupled to the circular buffer, wherein the digital-to-analog converter converts digital samples from the circular buffer into a transmitted signal, and when the host computer fails to write a next digital simple from the series to the circular buffer in time for conversion, the digital-to-analog converter converts a previously converted sample from the circular buffer in place of the next digital sample from the series.

2. The system of claim 1, wherein the means for generating and writing comprises a routine executed by the host computer in response to an interrupt signal from the device.

3. The system of claim 2, wherein the device further comprises:

a clock circuit which generates a clock signal that controls a rate at which the digital-to-analog converter converts digital samples; and an interrupt control circuit which generates the interrupt signal, wherein the interrupt signal has a frequency which depends on a frequency of the clock signal and on a size of the circular buffer.

4. The system of claim 1, wherein the circular buffer comprises:

a memory;

a first counter coupled to provide an address signal to the memory during a write operation, wherein the address signal provided by the first counter changes each time a digital sample is written to the memory;

a second counter coupled to provide the address signal to the memory during a read operation, wherein the address signal provided by the second counter changes each time a digital sample is read from the memory; and a control circuit coupled to the first and second counters, wherein the control resets the first counter if the address signal provided by the first counter represents a wrap-around address and resets the second counter if the address signal provided by the second counter represents the wrap-around address.

5. The system of claim 4, wherein the device further comprises a register coupled to the control circuit and accessible by the host computer, wherein the register stores the wrap-around address.

6. The system of claim 4, further comprising means for changing the wrap-around address.

7. The system of claim 1, wherein the digital-to-analog converter converts samples from the circular buffer at a fixed sampling frequency, and a carrier frequency of the analog signal in compliance with the communication protocol is an integer multiple of the sampling frequency divided by a number of storage locations used in circular buffer.

8. The system of claim 7, wherein a baud frequency of the analog signal in compliance with the communication protocol is an integer multiple of the sampling frequency divided by the number of storage locations used in the circular buffer.

9. The system of claim 1, wherein the digital-to-analog converter converts samples from the circular buffer at a fixed sampling frequency, and a baud frequency of the analog signal in compliance with the communication protocol is an integer multiple of the sampling frequency divided by a number of storage locations used in circular buffer.

10. A communication device comprising:

an interface circuit adapted for connection to a local bus of a host computer;

a circular buffer coupled to receive and store digital samples from the local bus; and a digital-to-analog converter coupled to the circular buffer, wherein the digital-to-analog converter converts samples from the circular buffer into an analog signal for transmission on a communication line, wherein the digital-to-analog converter repeatedly converts the same digital samples in a circular order of the circular buffer when the circular buffer does not receive new digital samples in time for conversion.

11. The device of claim 10, further comprising an interrupt control circuit which generates an interrupt signal having a first frequency, wherein a clock signal that determines a rate at which the digital-to-analog converter receives samples from the circular buffer has a second frequency which is an integer multiple of the first frequency.

12. The device of claim 10, wherein the circular buffer comprises:

a memory;

a first counter coupled to provide an address signal to the memory during a write, wherein the address signal provided by the first counter changes each time a digital sample is written to the memory;

a second counter coupled to provide the address signal to the memory during a read, wherein the address signal provided by the second counter changes each time a digital sample is read from the memory; and a control circuit coupled to the first and second counters, wherein the control resets the first counter when the address signal provided by the first counter represents a wrap-around address and resets the second counter when the address signal provided by the second counter represents the wrap-around address.

13. The device of claim 12, further comprising means for changing the wrap-around address.

14. The device of claim 10, wherein the interface circuit is adapted for connection to an ISA bus.

15. The device of claim 10, wherein:

the analog signal is a communication signal having a carrier frequency;

the digital-to-analog converter converts samples at a sampling frequency; and the circular buffer has a size such that the carrier frequency is an integer multiple of the sampling frequency divided by the number of storage locations used in the circular buffer.

16. The device of claim 15, wherein the size of the circular buffer is also such that a baud frequency of the analog signal is an integer multiple of the sampling frequency divided by the number of storage locations used in the circular buffer.

17. The device of claim 10, wherein:

the analog signal is a communication signal having a baud frequency;

the digital-to-analog converter converts samples at a rate indicated by a sampling frequency; and the circular buffer has a size such that the baud frequency is an integer multiple of the sampling frequency divided by the number of storage locations used in the circular buffer.

18. A method for generating a communication signal, comprising:

generating a series of digital samples which represent an analog signal in compliance with a communication protocol;

periodically writing the digital samples from the series to a set of storage locations; and converting the digital samples from the storage locations into analog voltages in a transmitted signal, wherein the digital samples are converted according to a circular ordering of the storage locations in the set, and when periodically writing the digital samples fails to provide a next sample in the series when required for conversion, a previously converted sample which is next in the circular ordering is converted in place of the next sample in the series.

19. The method of claim 18, further comprising generating a series of interrupts to a processor, wherein:

the processor writes digital samples to the set of storage locations when responding to an interrupt from the series; and when the processor fails to respond to an interrupt from the series, converting the digital samples comprises converting previously converted digital samples that are still stored in the set of storage locations.

20. A method for generating a communication signal, comprising:

executing a program in a host computer to generate a series of digital samples that represents an analog signal in compliance with a communication protocol;

generating interrupts to the host computer;

writing the digital samples to a buffer, wherein the host computer writes the digital samples when responding to the interrupts;

converting digital samples from the buffer into voltage levels of the communication signal; and in response to one or more of the interrupts to which the host computer does not respond, maintaining the communication signal by repeating conversion of digital samples stored in the buffer.

21. The method of claim 20, wherein:

generating interrupts comprises generating interrupts with a periodicity equal to a time required for converting half of the digital samples in the buffer; and the buffer is partitioned into a first half and a second half; and writing digital samples to the buffer comprises filling one half of the buffer with digital samples while converting samples from the other half of the buffer.

22. The method of claim 21, wherein writing digital samples comprises filling one half of the buffer each time the host computer writes samples in response to an interrupt.

23. The method of claim 22, further comprising:

ignoring a first interrupt so that the host computer fails to write samples into the buffer in response to the first interrupt;

generating a count indicating a number of interrupts which the host computer ignored;

in response to a second interrupt, determining from the count whether digital samples currently being converted are from the first or second half of the buffer; and filling the first half of the buffer with digital samples in response to the second interrupt signal, only if currently converting digital samples from the second half of the buffer.

* * * * *